US006425084B1

United States Patent
Rallis et al.

(12) United States Patent
(10) Patent No.: US 6,425,084 B1
(45) Date of Patent: *Jul. 23, 2002

(54) NOTEBOOK SECURITY SYSTEM USING INFRARED KEY

(75) Inventors: William N. Rallis, Framingham; Yaacov Behar, Winchester, both of MA (US)

(73) Assignee: Durango Corporation, Framingham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/685,811

(22) Filed: Oct. 10, 2000

Related U.S. Application Data

(63) Continuation of application No. 09/127,218, filed on Jul. 31, 1998, which is a continuation-in-part of application No. 09/022,088, filed on Feb. 11, 1998, now Pat. No. 6,189,099.

(51) Int. Cl.[7] .............................. H04L 9/32; H04L 9/10
(52) U.S. Cl. ...................... 713/185; 713/170; 713/172; 705/65; 705/66; 705/67
(58) Field of Search .............................. 713/168, 170, 713/172, 185; 705/65, 66, 67, 72; 380/227, 228, 229, 230

(56) References Cited

U.S. PATENT DOCUMENTS

| | | | |
|---|---|---|---|
| 4,609,777 A | 9/1986 | Cargile | 178/22.08 |
| 4,789,859 A | 12/1988 | Clarkson et al. | 740/825.31 |
| 4,937,437 A | 6/1990 | Ferguson | 235/782 |
| 4,975,550 A | 12/1990 | Panchisin | 200/43.08 |
| 4,993,627 A | 2/1991 | Phelan et al. | 235/382 |
| 5,012,514 A | 4/1991 | Renton | 380/4 |
| 5,072,101 A | 12/1991 | Ferguson | 235/441 |
| 5,077,911 A | 1/1992 | Stickel et al. | 70/58 |
| 5,081,676 A | 1/1992 | Chou et al. | 380/4 |
| 5,142,269 A | 8/1992 | Mueller | 340/568 |
| 5,265,163 A | 11/1993 | Golding et al. | 380/25 |
| 5,287,408 A | 2/1994 | Samson | 380/4 |
| 5,313,639 A | 5/1994 | Chao | 395/725 |
| 5,341,421 A | 8/1994 | Ugon | 380/4 |
| 5,361,610 A | 11/1994 | Sanders | 70/14 |

(List continued on next page.)

OTHER PUBLICATIONS

Wiener, P et al., "Meeting USP and IEEE 1394 Overcurrent Protection Requirements Using PolySwitch Devices," Wescon/97 Conf. Proc., Nov. 6, 1997, pp. 442–475.

(List continued on next page.)

*Primary Examiner*—Gail Hayes
*Assistant Examiner*—Justin T. Darrow
(74) *Attorney, Agent, or Firm*—Cesari and McKenna, LLP; A. Sidney Johnston

(57) ABSTRACT

A multilevel infrared (IR) type security system prevents unauthorized use of a computer. A program resident on the computer implements a user-validation procedure. An IR key device carries a first serial number and an encryption key. A second serial number corresponds to a device internal to the computer. A mass storage device installed in the computer stores a validation record that includes an unencrypted portion and an encrypted portion, the unencrypted portion including a copy of the first serial number and the encrypted portion including a copy of said second serial number and a user personal identification number. The key device is coupled and interfaced with an infrared port on the computer by the user. The first serial number and the encryption key are read from the key device in order to gain authorized use of the computer. The key device may be decoupled from the computer after authorized use of the computer has been gained, and during operation of the computer.

33 Claims, 16 Drawing Sheets

U.S. PATENT DOCUMENTS

| | | | |
|---|---|---|---|
| 5,367,295 A | 11/1994 | Gokcebay et al. | 340/825.31 |
| 5,402,492 A | 3/1995 | Goodman et al. | 380/25 |
| 5,416,840 A | 5/1995 | Cane et al. | 380/4 |
| 5,450,271 A | 9/1995 | Fukushima et al. | 361/686 |
| 5,461,218 A | 10/1995 | Castleman et al. | 235/382 |
| 5,475,839 A | 12/1995 | Watson et al. | 395/650 |
| 5,499,297 A | 3/1996 | Boebert | 3820/23 |
| 5,517,569 A | 5/1996 | Clark | 380/52 |
| 5,533,125 A | 7/1996 | Bensimon et al. | 380/4 |
| 5,542,044 A | 7/1996 | Pope | 395/186 |
| 5,546,463 A | 8/1996 | Caputo et al. | 380/25 |
| 5,548,479 A | 8/1996 | Hyvarinen | 361/684 |
| 5,568,552 A | 10/1996 | Davis | 380/4 |
| 5,572,193 A * | 11/1996 | Flanders et al. | 340/825.34 |
| 5,587,878 A | 12/1996 | Tsai et al. | 36/683 |
| 5,588,059 A | 12/1996 | Chandos et al. | 380/21 |
| 5,598,323 A | 1/1997 | Muller | 36/726 |
| 5,603,008 A | 2/1997 | Hilton et al. | 385/491 |
| 5,606,615 A | 2/1997 | Lapointe et al. | 380/25 |
| 5,608,387 A | 3/1997 | Davies | 740/825.34 |
| 5,610,981 A | 3/1997 | Mooney et al. | 380/25 |
| 5,623,637 A | 4/1997 | Jones et al. | 395/491 |
| 5,642,805 A | 7/1997 | Tefft | 200/43.08 |
| 5,651,068 A | 7/1997 | Klemba et al. | 380/25 |
| 5,657,470 A | 8/1997 | Fishman et al. | 395/480 |
| 5,732,137 A | 3/1998 | Aziz | 380/25 |
| 5,867,106 A | 2/1999 | Bi et al. | 340/825.31 |
| 6,038,549 A * | 3/2000 | Davis et al. | 705/35 |
| 6,189,099 B1 * | 2/2001 | Rallis et al. | 713/172 |
| 6,216,230 B1 * | 4/2001 | Rallis et al. | 713/185 |

OTHER PUBLICATIONS

SecurityPak—Complete Computer Security Solution, found at <http://acan.net/~portapak/securitypak.html> (Jul. 2, 2001).

SafeHouse, found at <http://www.pcdynamics.com/SafeHouse/Features.asp> (Jul. 2, 2001).

Serial Cable with Security Key, found at <www.scinto.com/skeyl.htm> (Jul. 2, 2001).

EY–LOK II dongle security devices, found at <http://www.keylok.com> (Jul. 2, 2001).

BluVenom Disk Locking Anti–Theft Device, found at <http://www.bluvenom.com/home.html> (Jul. 2, 2001).

Tajnai, Joe of HP and PETRILLA, John of HP, Infrared Data Association Serial Infrared Physical Layer LInk Specification, Version 1.2, Nov. 10, 1997.

Nykanen, Petri and Rubin, Paul and Cheponis, Mike, Infrared Data Association Guidelines for Ultra Protocols, Version 1.0, Oct. 15, 1997.

* cited by examiner

US 6,425,084 B1

NOTEBOOK SECURITY SYSTEM USING INFRARED KEY

CROSS-REFERENCE TO RELATED APPLICATIONS

The present application is a continuation of commonly assigned copending U.S. patent application Ser. No. 09/127,218, now U.S. Pat. No. 6,216,230 which was filed on Jul. 31, 1998, by Rallis et al. for a Notebook Security System (NBS) and is hereby incorporated by reference, which is a C-I-P of U.S. application Ser. No. 09/022,088, filed Feb. 11, 1998, now U.S. Pat. No. 6,189,099 and incorporated herein by reference.

BACKGROUND OF THE INVENTION

Theft is a serious and expensive problem for the users of notebook, or laptop, computers. It has been estimated that over a quarter of a million notebook computers are stolen each year, and a majority of business firms report losses from notebook computer theft. In addition to the value of the hardware, users may also suffer the loss of data stored on the computers. Conventional methods for protecting computer hardware consist of either physically isolating the computer in a locked room or mechanically securing the computer to a fixed object. However, such devices are cumbersome to use and defeat the mobility of the notebook computer.

There are notebook computer security systems that electronically track a computer and sound an alarm when it is moved a certain distance from the user. However, users will often disarm such security features because they restrict personal movement, and passersby will typically ignore audible alarms and similar warning devices. Another security system is a password program that directs the computer to secretly dial a security company when an improper password is entered. The security company uses the caller ID feature to locate the computer. This system may be defeated by intercepting the out-going call. Other security devices, such as "smart cards" and dongles, are also available, but these devices are designed for the protection of data and not for the deterrence of theft of computers.

Therefore, what is needed is an easy-to-use and low cost security system to deter the theft of a notebook computer.

SUMMARY OF THE INVENTION

Briefly, a security system constructed in accordance with the invention implements a user-validation procedure that requires the user to connect the proper hardware "key" device to a computer at power-up to enable operation. The system can support multiple users and a single supervisor. Each authorized user is provided with a unique key device which is carried and stored separately from the computer. The key device holds a unique serial number and an encryption key. A validation record stored on the computer's hard disk contains an unencrypted key device serial number, an encrypted hard disk serial number, and a Personal Identification Number (PIN) unique to the user.

A program that is automatically invoked at computer power-up, or reset, implements the user-validation procedure. The user is prompted to connect the key device to the computer. In the preferred embodiment, the user is prompted to enter a PIN, although the system can be configured to operate without manual PIN entry. The procedure permits entry past a first security level only if the key device serial number matches the unencrypted numbers in the validation record. If the first-level validation is successful, the procedure then uses the encryption key to decrypt the hard drive serial number and PIN found in the stored validation record. The procedure permits entry past the second security level only if the validation record is properly decrypted, the installed hard disk serial number matches the decrypted number, and the manually-entered PIN matches the decrypted PIN. A failure at any step in the user-validation procedure will immediately power down the computer, thereby rendering it useless to a thief not possessing the required key device.

Because the key device is not required for normal computer operations, after the user-validation procedure has successfully terminated, the user can remove the key device and keep it separate from the computer. Moreover, the small size of the key device makes it easy to transport and keep safe.

BRIEF DESCRIPTION OF THE DRAWINGS

The above and further advantages of the invention may be better understood by referring to the following description in conjunction with the accompanying drawing, in which.

DETAILED DESCRIPTION OF AN ILLUSTRATIVE EMBODIMENT

Figure 1A:
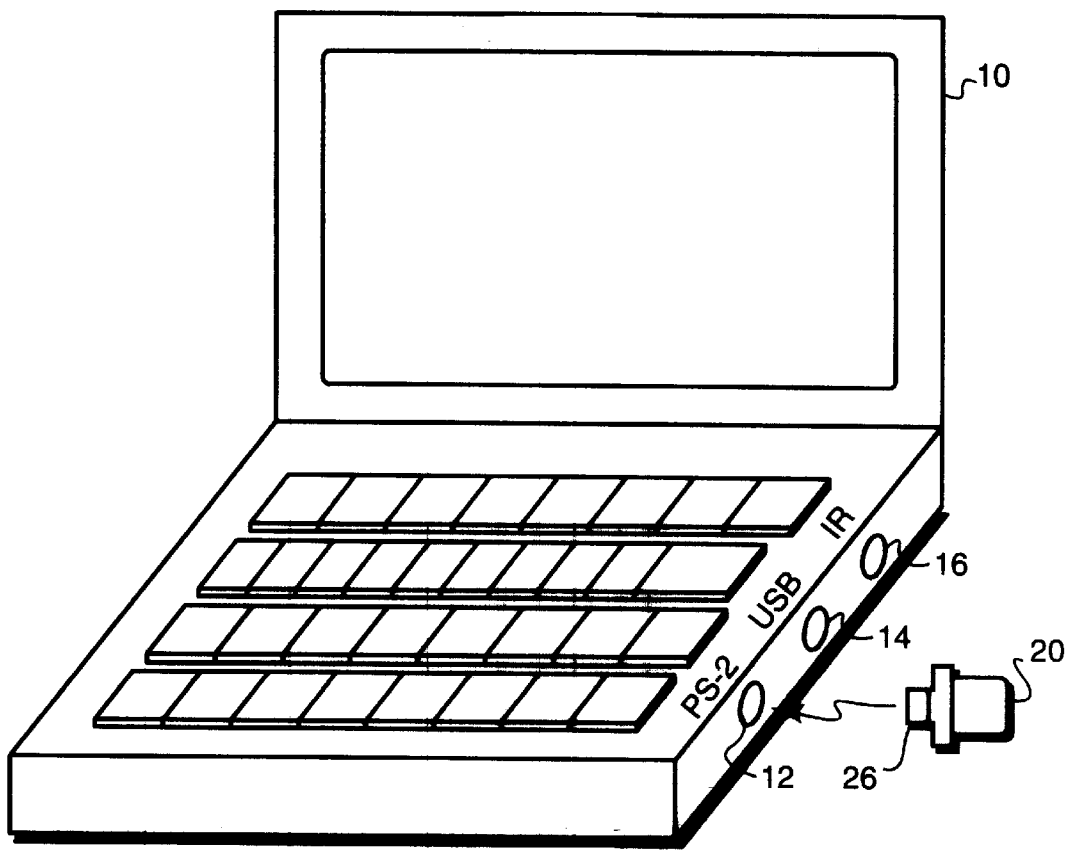
FIG. 1A is an illustration of the Notebook Security System (NBS)
Figure 1B:
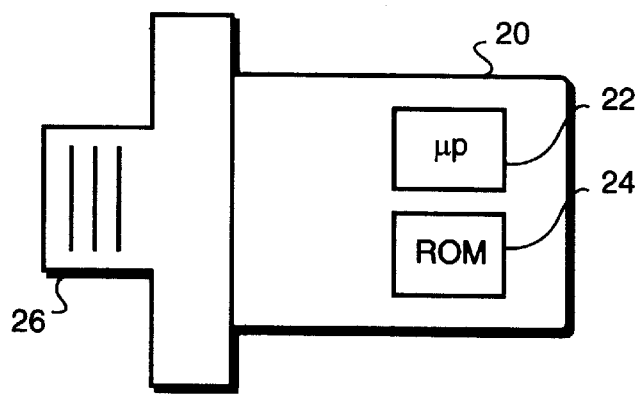
FIG. 1B is an illustration of a key device.

FIG. 1A shows a key device 20 connected to a notebook computer 10. The key device 20, shown in FIG. 1B, has no external controls and is comprised of a microcomputer 22, a read-only-memory 24 and a connector 26. The connector 26 may attach to one of the I/O ports on the notebook computer 10. The preferred key device connection is via a PS-2 connector 12, although alternative connections, such as a Universal Serial Bus (USB) 14 and an Infra-Red (IR) port 16, can be used as described below. Although the security system has been designed for use with a notebook computer 10, it will be recognized that the system can be adapted for use with other computers, such as a desktops or Personal Digital Assistants (PDA).

Ideally, the key device 20 is of such shape and size as to be placed on the user's key chain. It receives power and command messages from the notebook computer 10 and returns response messages, a serial number and an encryption key. A program running on the notebook computer 10 uses the key device serial number and the encryption key, along with a Personal Identification Number (PIN), in a user-validation procedure to prevent operation (i.e. power-up) of the note book computer 10 by an unauthorized user. For maximum security protection, the key device 20 is connected only during the user-validation procedure and is carried and stored separately from the notebook computer 10.

Figure 2:
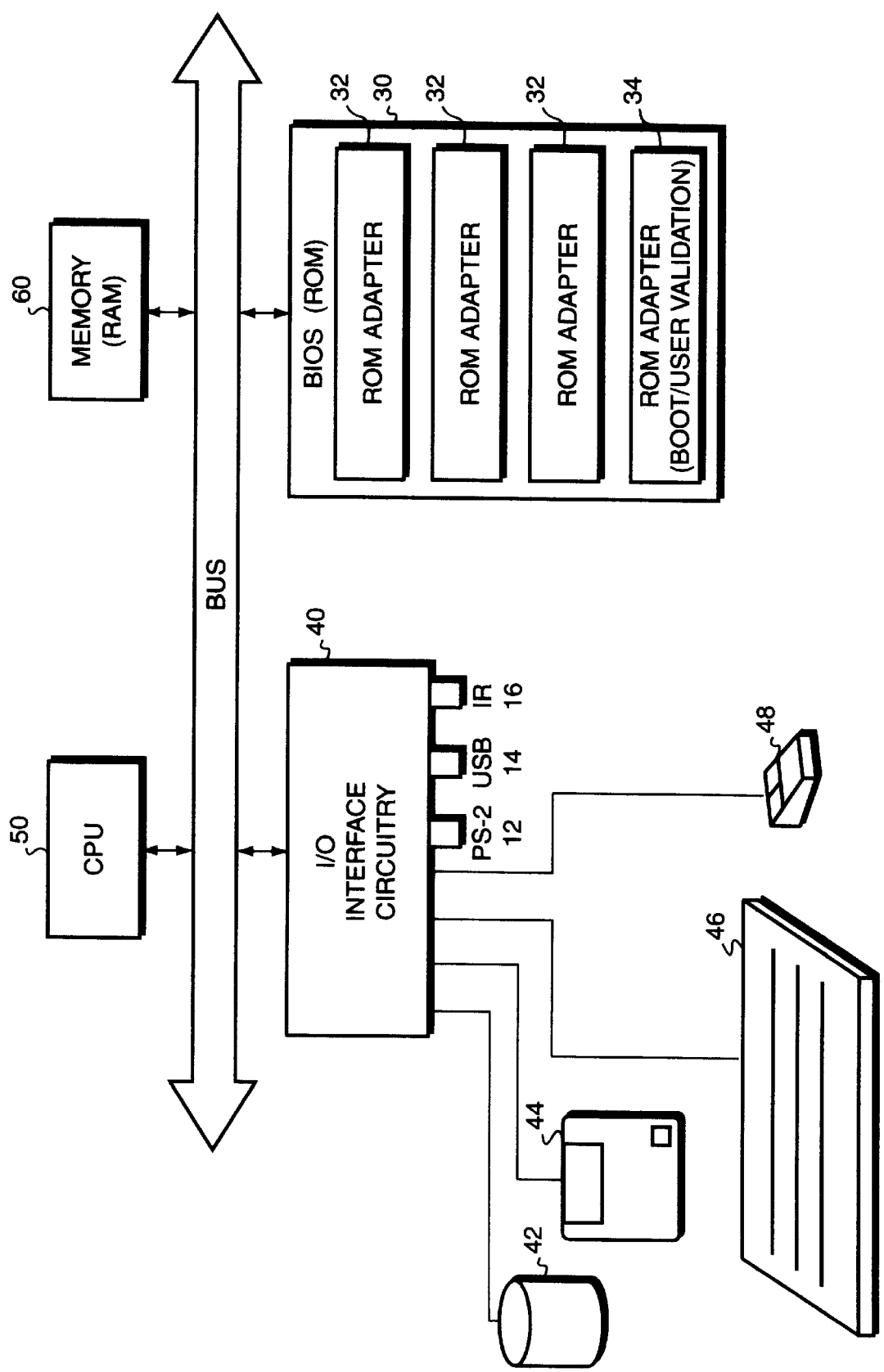
FIG. 2 is a block diagram of the major components within the CPU address space of an IBM-PC compatible computer.

FIG. 2 is a block diagram of the major components within the Central Processing Unit (CPU) 50 address space for a conventional IBM PC-compatible computer. At power-up, the CPU 50 accesses the Basic Input/Output System (BIOS) Read-Only Memory (ROM) 30 and executes a "boot-up" procedure. Prior to the termination of the boot-up procedure, the CPU downloads the operating system (OS) program via a memory-mapped interface 40 from a mass storage device, such as a hard drive 42 or possibly a diskette 44, and reads it into main Random-Access Memory (RAM) memory 60. In the preferred embodiment of the invention, the boot-up user-validation program resides in a ROM adapter 34 of the BIOS 30 and is executed at boot-up and prior to the download of the operating system.

Figure 3A:
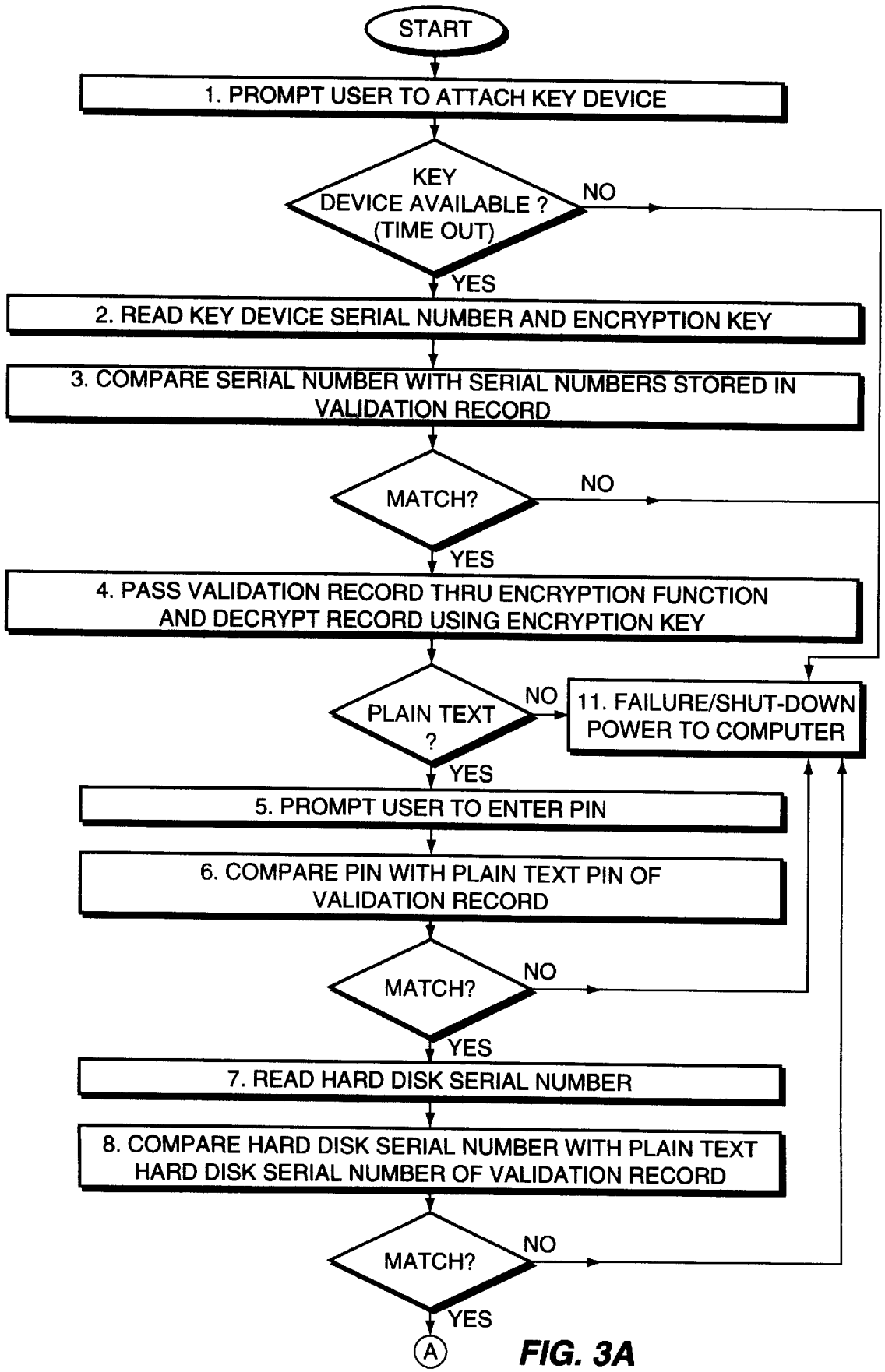
FIG. 3 is a flow diagram of the boot and user-validation procedure.
Figure 3B:
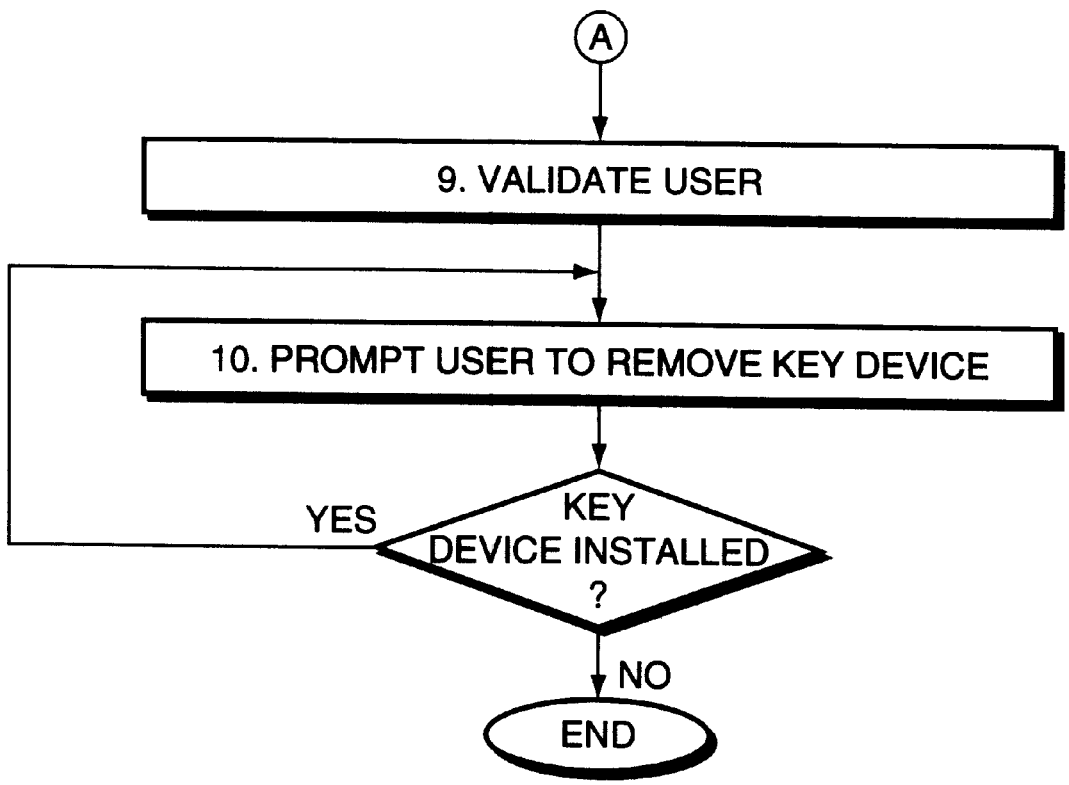

A flow diagram of the user-validation procedure is shown in FIG. 3. In Step 1, the user-validation program prompts the user to attach the key device 20 to the notebook computer 10. The program attempts to communicate with the key device 20 for a fixed delay period. If a key device 20 is not detected within this period, then the program proceeds to Step 11 where the computer is automatically powered down. In Step 2, the program reads the key device serial number and encryption key that are stored in the key-device ROM 24. The key device serial number and encryption key, usually a large prime number, are loaded into the key device 20 by the manufacturer.

The protocol for interfacing the key device 20 to the computer 10 through a PS-2 port 12 or a USB port 14 is shown in FIG. 4. The first portion, shown in FIG. 4A, is the standard, or conventional, initialization protocol flow between the notebook computer 10 and either a keyboard 46 or a mouse 48. After power up or a reset (FF) command from the BIOS, the device will identify its type ("AA"=keyboard; "AA 00"=mouse). A read identification (F2) command is then issued and a keyboard 46, for example, will return an acknowledgment (FA) response and the "AB 41" identification number.

Figure 4A:
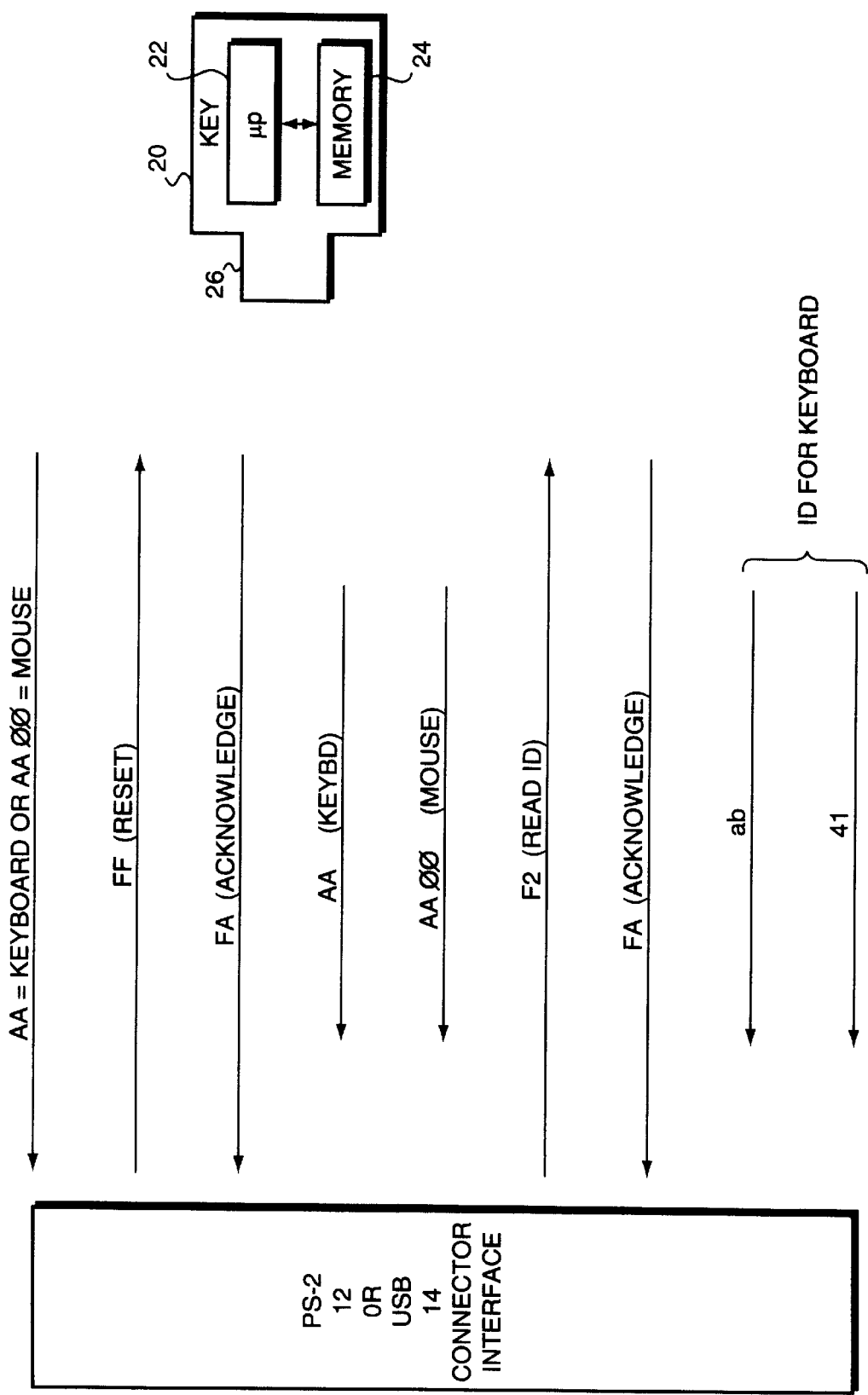
FIGS. 4A–4C depict the PS2/USB interface protocol.
Figure 4B:
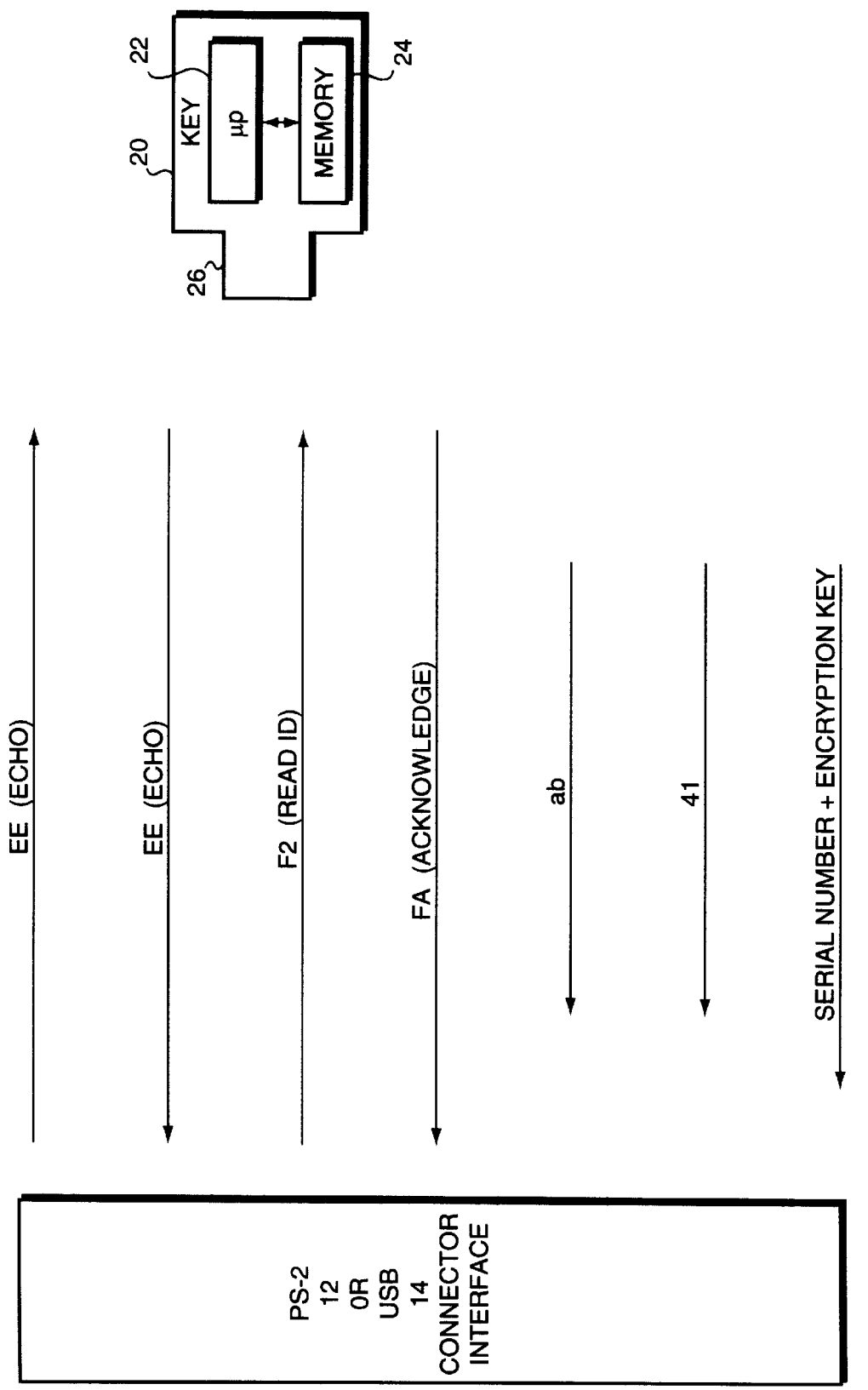

A novel protocol for reading the key device data through a PS-2 or USB port is shown in FIG. 4B. After the initialization protocol is executed, the key device 20 waits for a unique two-command sequence that it will recognize as the cue for sending the key device serial number and encryption key. For illustrative purposes, the sequence is shown as an echo (EE) command followed by a read identification (F2) command. The program sends an echo (EE) command to the key device 20. The key device 20 returns an echo (EE) response. After the echo test bits have been verified, the program issues a read identification (F2) command to the key device 20. The key device 20 returns an acknowledgment (FA) response and the "AB 41" identification number and further appends the key device serial number and encryption key. In this example, the key device 20 appends the serial number and encryption key only when the read identification (F2) command is immediately preceded by the echo (EE) command.

In Step 3, the program compares the key device serial number to the corresponding number in a set of stored validation records, one of which is maintained for each user. The records are stored in a reserved sector of the hard disk 42, or other mass storage device, preferably when the security system software is installed on the computer. Each validation record is comprised of the following fields:

FIELD 1—key device serial number (standard ASCII characters)

FIELD 2—personal identification number (PIN) (encrypted)

FIELD 3—internal device serial number (encrypted)

FIELD 4—level: user or supervisor (encrypted)

FIELD 5—user encryption keys (encrypted)

FIELD 6—user information (encrypted)

If the key device serial number received from the key device 20 does not match field 1 of any of the validation records, then the program proceeds to Step 11.

In Step 4, the program uses the encryption key to decrypt the encrypted portions of the validation record. If the decrypted record reads as plain ASCII text, the program moves to Step 5, otherwise, it proceeds to Step 9. In Step 5, the user-validation program prompts the user to enter a PIN. The PIN consists of a string of six to eight characters. In Step 6, the program compares the PIN to the corresponding number stored in field 2 of the decrypted validation record. If the numbers do not match, the program moves to Step 11. If the system is configured to operate without the manual entry of a password or PIN, Steps 5 and 6 are bypassed.

At Step 7, the program reads the serial number of an internal device, preferably the hard disk 42. The retrieved serial number is compared to the plain text serial number of field 3 of the validation record. If the serial numbers match, the user has been validated. If the numbers do not match, the program moves to Step 11.

In Step 10, the program waits for the key device 20 to be disconnected from the notebook computer 10. It periodically executes the read protocol of FIG. 4B to determines whether the key device serial number and encryption key data are appended to the acknowledgment (FA) response. When the key device data is not appended to the acknowledgment (FA) response, the program terminates and normal computer operations can commence.

In a multiple user situation, a supervisor is designated by setting the single bit of field 4 of the validation record. If the bit is set, the supervisor can gain access to the users' encryption keys which are stored in field 5. The user information in field 6 holds user-specific data stored for informational purposes.

To provide protection against the copying of the serial number and encryption key data from the key device 20, a "super key" access code procedure may be programmed by the manufacturer into the key device 20, and a "super key" verification step may be inserted at the start of the user validation procedure. The access code procedure requires the key device 20 to verify receipt of a matching code number before it will output the serial number and encryption key data. Preferably, the access code "hops", or changes, each time the key device 20 is accessed.

Figure 4C:
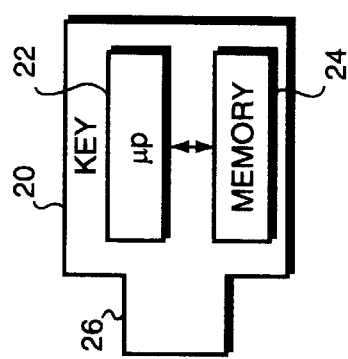
Figure 4C:
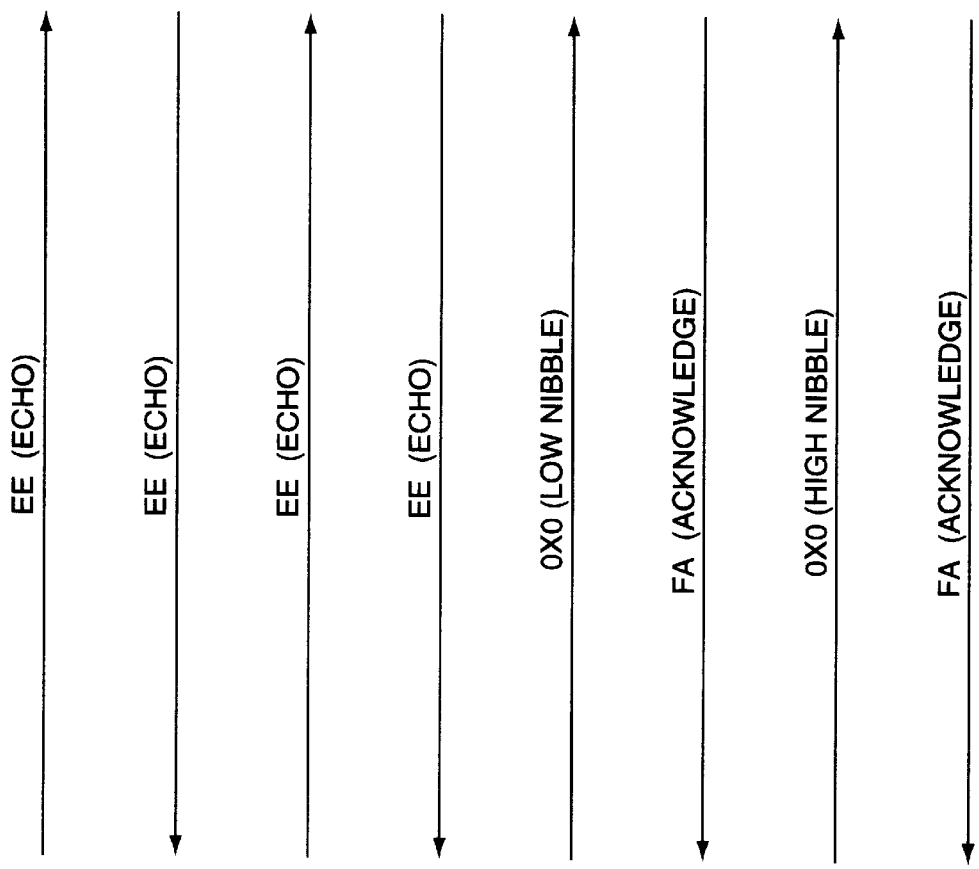

A novel protocol for writing data to the key device 20 through a PS-2 port 12 or a USB port 14 is shown in FIG. 4C. The write protocol is executed after the initialization protocol of FIG. 4A and prior to the read protocol of FIG. 4B. The key device 20 waits for a unique two-command sequence that it will recognize as the signal that the program is sending one byte of data. For illustrative purposes, the sequence is shown as two consecutive echo (EE) commands. After the echo test bits are verified, the program issues a low nibble (0X0; X=low nibble data) data message to the key device 20. The key device 20 returns an acknowledgment (FA) response. The program next issues a high nibble (0Y0; Y=high nibble data) data message to the key device 20 and the key device 20 again returns an acknowledgment (FA) response.

The "super key" access code number that is sent by the program to the key device 20 may be longer than one byte.

The write protocol of FIG. 4C is repeated as necessary for each additional byte of data. The key device 20 microprocessor 22 concatenates the low and high nibbles and compares the resulting number to the access code number stored in its memory 24. If the numbers do not match, the key device 20 will not append the serial number and encryption key data to the acknowledgment (FA) response as shown in FIG. 4B.

Alternative physical connections can be employed to connect the key device 20 to a notebook computer 10 as shown in FIG. 5. Any serial or parallel port may be used, although the PS-2 and USB port connections, shown respectively in FIG. 5A and 5B, are preferred because of their small size. As an alternative to serial number and encryption key data, the key device 20 can include special security features, such as a finger print-reader 28 (FIG. 5C), or a "smartcard" reader that senses data on a "smartcard" 29 (FIG. 5D), to generate key data. This data is forwarded by the key device 20 to the user-validation program in a manner identical to the transmission of serial number and encryption key data.

Figure 5A:
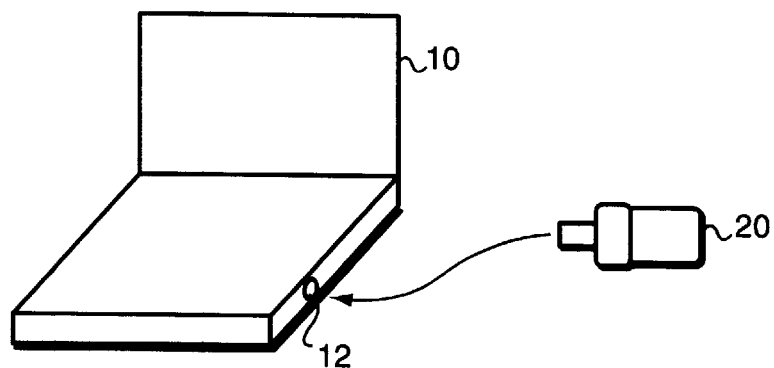
FIGS. 5A–5F illustrate various key device-to-computer interfaces.
Figure 5B:
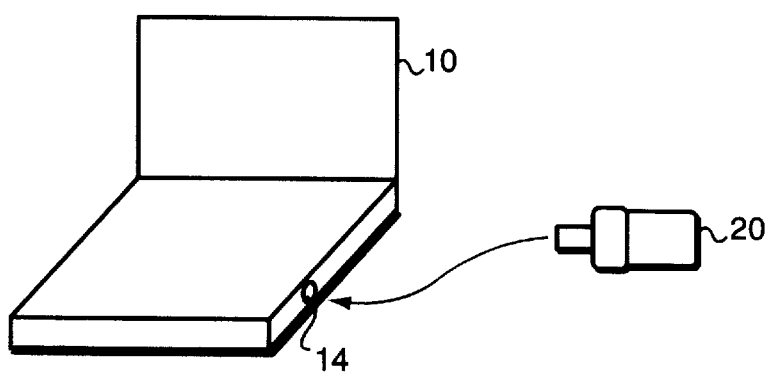
Figure 5C:
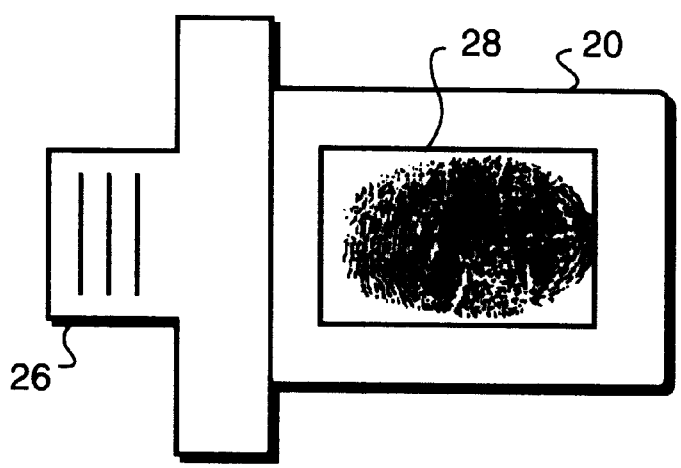
Figure 5D:
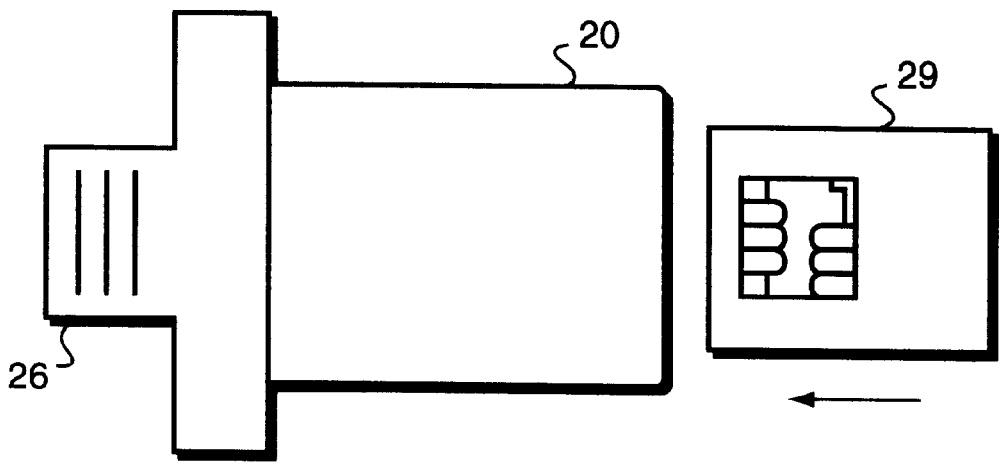
Figure 5E:
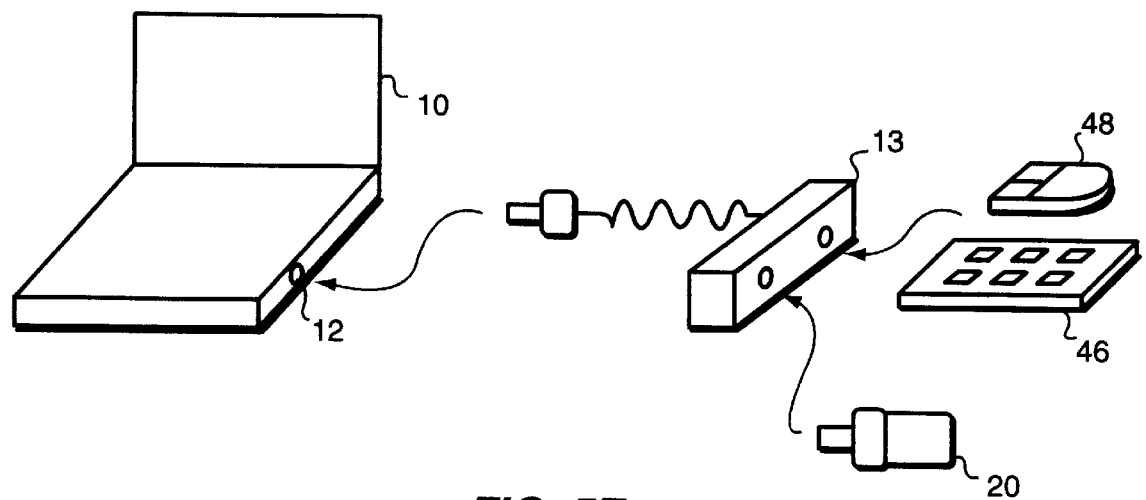
Figure 5F:
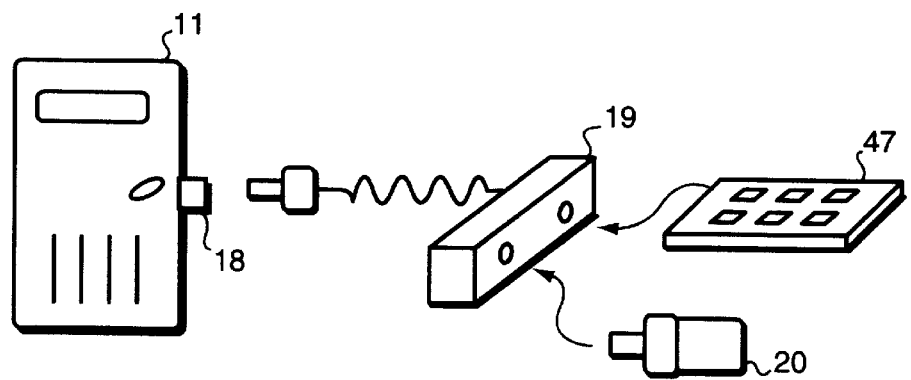

In another alternative a PS-2 "Y" connector 13, equipped with an internal automatic switch (not shown), is employed to permit the simultaneous PS-2 connection of a key device 20 and a keyboard 46 (or mouse 48) to a notebook computer 10 as shown in FIG. 5E. In a similar alternative, the key device 20 is connected to the keyboard port 18 of a desktop computer 11 via a AT "Y" connector 19, equipped with an internal automatic switch (not shown), that also permits the simultaneous connection of an AT keyboard board 47 as shown in FIG. 5F.

The internal automatic switch (not shown) in each "Y" connector is controlled by an internal microprocessor (not shown). The switch is configured to be normally open at the key device port and normally closed at the "pass-through" port of each "Y" connector. The microprocessor monitors the transmissions across the switch. When it detects the protocol command sequences described above, it temporarily switches the connection to the key device port and relays the command and response messages between the computer 10 and the key device 20. The switch automatically reverts back to pass-through mode when the computer 10/key device 20 communications are completed.

Figure 6A:
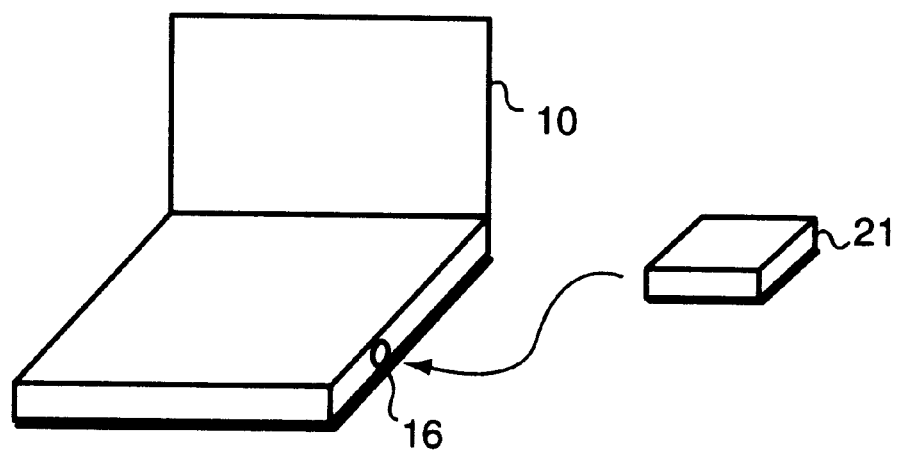
FIGS. 6A–6E illustrate various IR key device configurations.
Figure 6B:
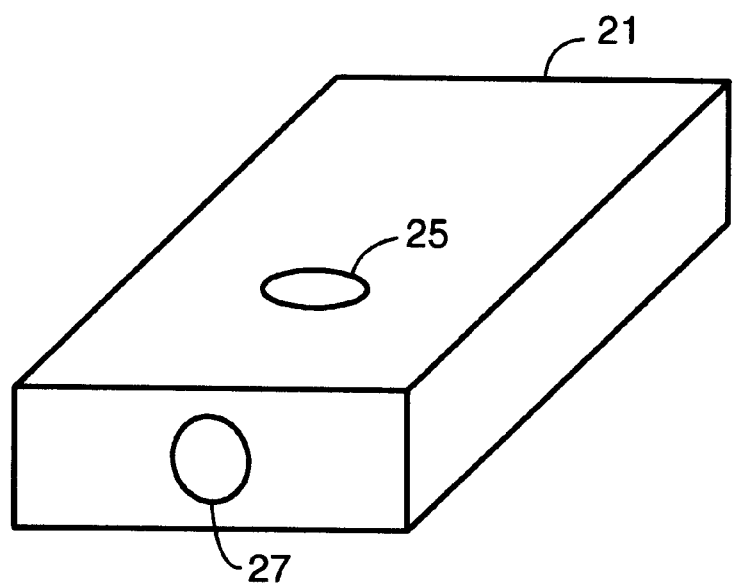

In an alternative interface, the IR key device 21 is equipped for Infrared (IR) communications with a notebook computer 10 via the IR port 16 as shown in FIG. 6A. Ideally, the IR key device 21 is of such shape and size as to be placed on the user's key chain. It is self-powered and in its basic configuration, as shown in FIG. 6B, includes an IR transmitter 27 and a momentary transmit switch 25, in addition to a microprocessor and ROM (not shown). When prompted by the user-validation program, the user aligns the IR key device 21 with the IR port 16 and depresses the switch 25 within the allotted time period (e.g. 30 seconds). The IR key device 21 transmits a message that includes the key device serial number and the encryption key using the Ultra Protocol as established by the Infrared Data Association (IrDA).

Figure 7:
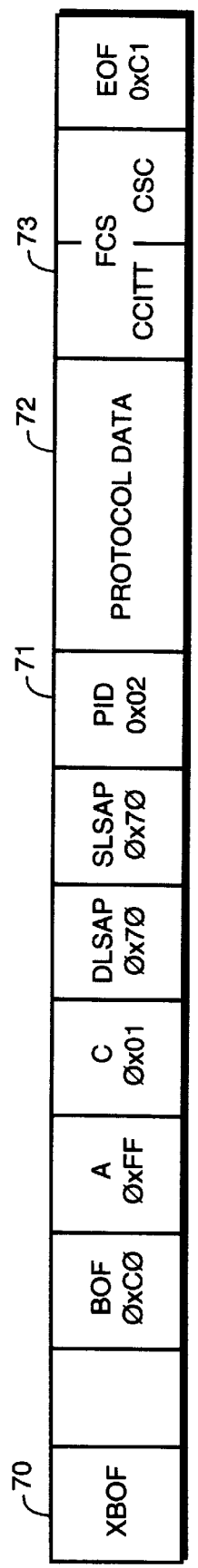
FIG. 7 depicts the IR interface message framing format.

The Ultra Protocol for exchanging messages between the IR key device 21 and the computer 10 through the IR port 16 is documented in "Infrared Data Association Guidelines for Ultra Protocols" which is incorporated by reference. The message framing and layer specific headers are shown in FIG. 7. The IR key device 21 utilizes a frame 70 identified by a unique Protocol Identification (PID) field 71 value, e.g. 02 h, assigned and reserved by IrDA. The key data resides in the variable length protocol data field 72. The frame size is specified in the Frame Check Sequence (FCS) field 73 which is CRC-CCITT (Cyclic Redundancy Check—International Telegraph and Telephone Consultative Committee; CRC with polynomial equal to $X^{16}+X^{12}+X^{5}+1$) error correction encoded. Note that all occurrences of the end-of-file (EOF) value (e.g. C1h) in the FCS field 73 are changed to prevent a premature EOF detection.

In the "super key" configuration, the IR key device 21 includes both an IR transmitter and IR receiver, but does not include a transmit switch. The IR key device 21 remains the powered-down state until it receives an IR pulse. After the user-validation program prompts the user to align the IR key device 21 with the IR port 16, it transmits a command message containing a "super key" access code number. The access code procedure requires the IR key device 21 to verify receipt of a matching code number before it will output the serial number and encryption key data. Preferably, the access code "hops", or changes, each time the IR key device 21 is accessed. If the IR key device 21 is verifies a match between the received access code and a number stored within the device, it transmits a response message containing the key device serial number and the encryption key.

Figure 6C:
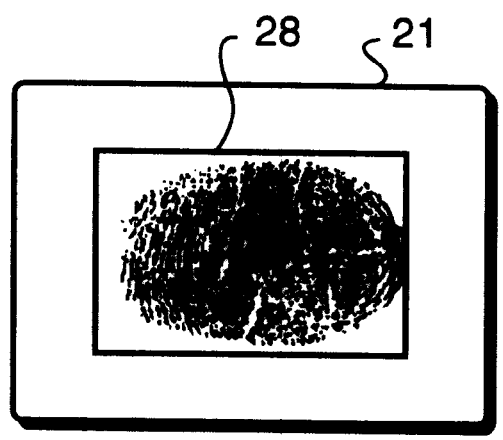
Figure 6D:
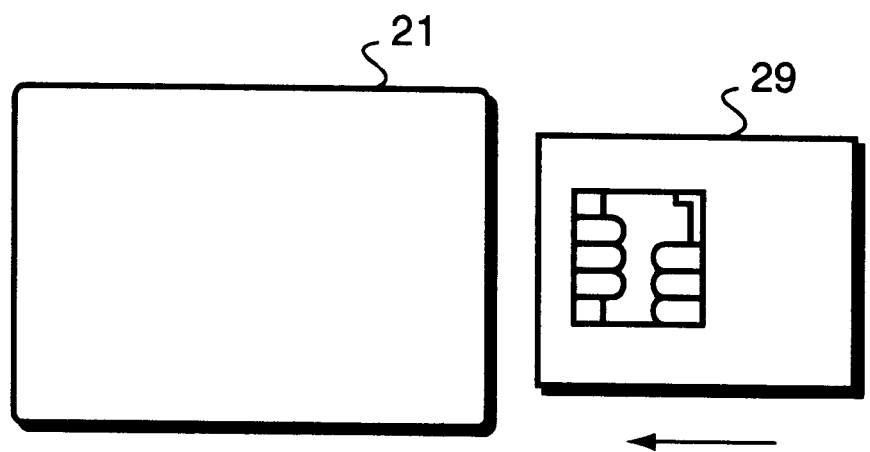

As an alternative to serial number and encryption key data, the IR key device 21 can include special security features, such as a finger print reader 28 (FIG. 6C), or a "smartcard" reader that senses data on a "smartcard" 29 (FIG. 6D), to generate the key data. This data is forwarded to the user-validation program in a manner identical to the IR transmission of the serial number and encryption key data, although a new PID is assigned to each new configuration.

Figure 6E:
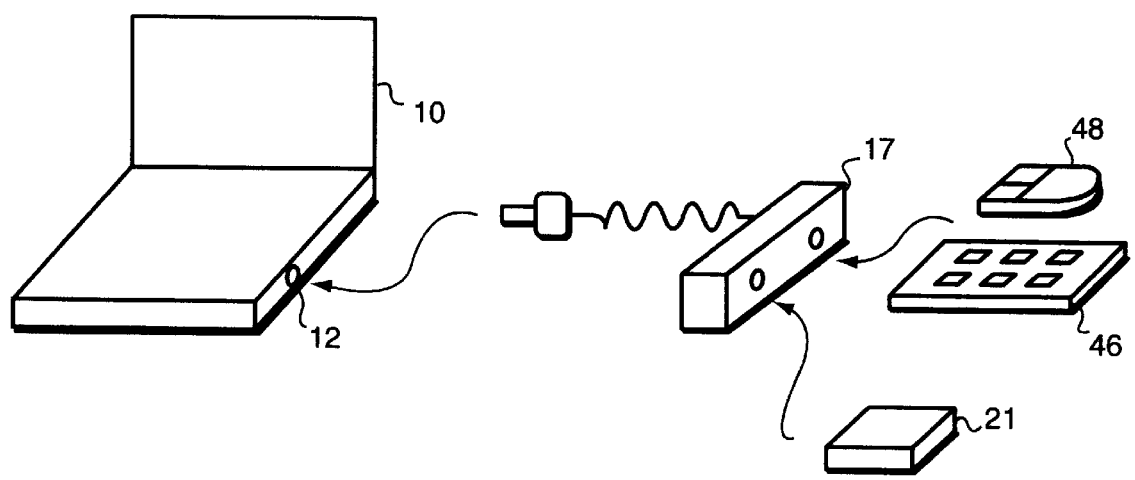

In another alternative, a PS-2/IR "Y" connector 17, equipped with an internal automatic switch (not shown), is employed to permit the simultaneous IR connection of an IR key device 21 and a keyboard 46 (or mouse 48) to a notebook computer 10 as shown in FIG. 6E.

Alternate physical configurations of the key device 20 are also possible. The key device 20 may be implemented as a Personal Computer Memory Card Industry Association (PCMCIA) card, a floppy diskette, or by any other detachable means for providing a key device serial number and an encryption key to the notebook computer 10.

As an added feature of the invention, an application program that implements the user-validation procedure may be installed with the security system and, preferably, on a Microsoft Windows 95/98/NT/CE platform. The application will provide either (user selected) automatic hard disk lock-up or computer power-down that triggers during normal operation after expiration of a user-defined inactivity period. The application also supports manual initiation of lock-up or power-down. In cases where the ROM BIOS program is not installed, the application can be used to prevent unauthorized user access to the hard disk contents.

Figure 8:
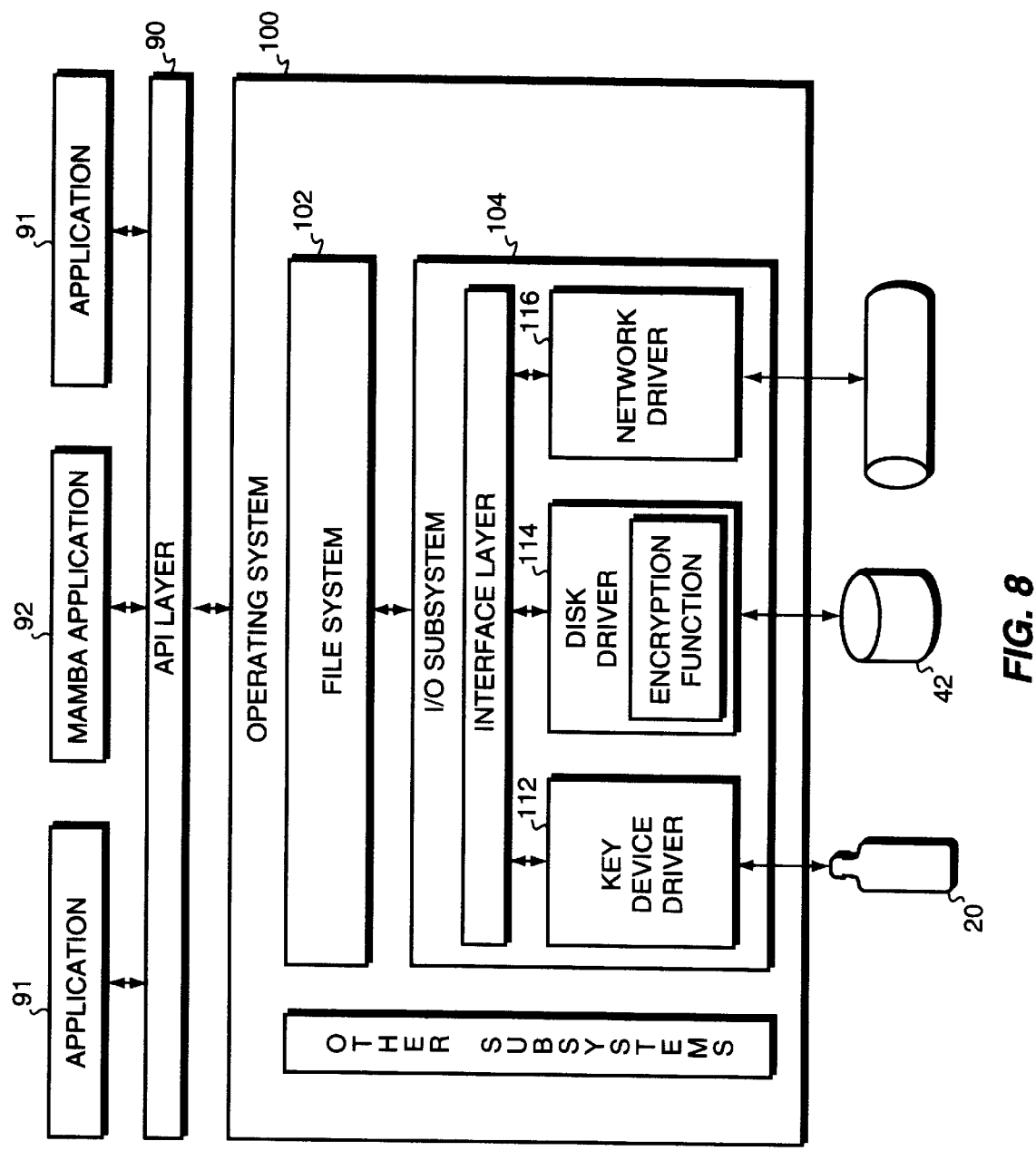
FIG. 8 is a block diagram of the software partitioning of an IBM-PC compatible computer.

To support the application on the Windows 95/98/NT/CE platform, an Operating System Interface (OSI) is provided. The application 92 is interfaced to the operating system 100 via an Application Program Interface (API) layer 90 as shown in FIG. 8. The OSI is comprised of two parts: the key device driver 112 and the OS visual interface. Within the I/O subsystem 104 an interface layer 110 supports various drivers, such as a disk driver 114, a key device driver 112, and a network driver 116. The key device driver 112 provides the application interface to the key device 20. It reads the key device serial number and the encryption key, matches the key device serial number to that of the validation record stored on the hard disk, and uses the encryption key to decrypt the encrypted portion of the validation record.

Figure 9:
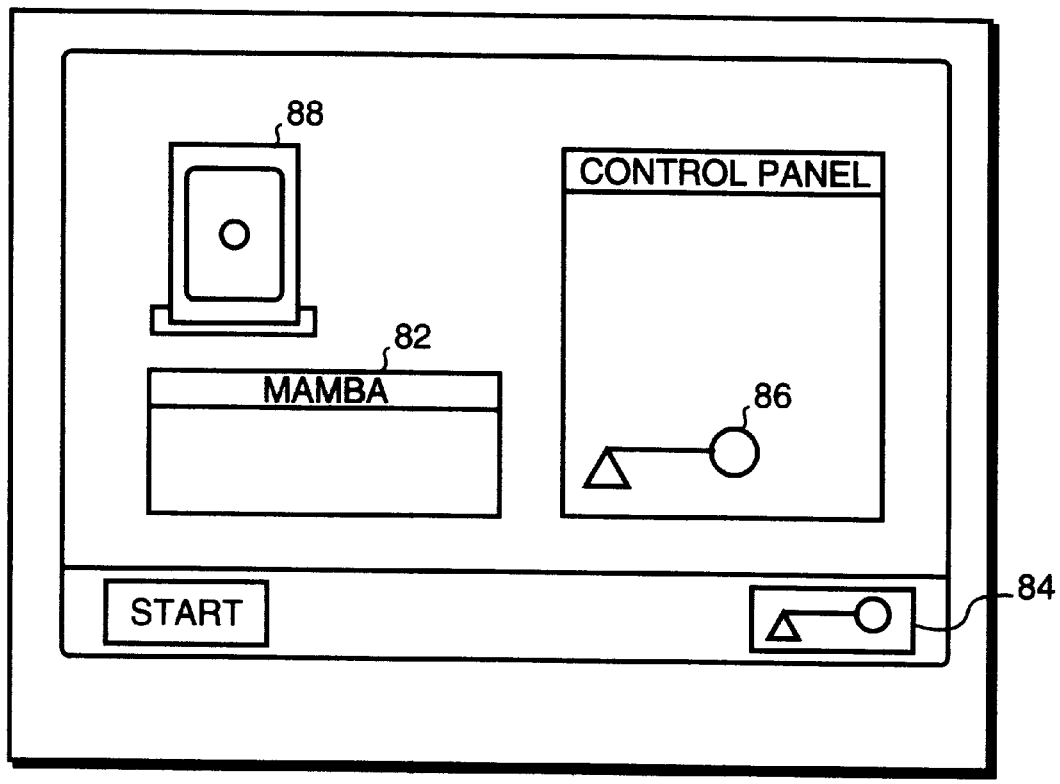
FIG. 9 is a depiction of the user screen of the user-validation program application.

An OS visual interface is illustrated in FIG. 9. The interface is comprised of a display window 82 for displaying messages to the user during the user-validation procedure or setting program parameters, a task bar "key" object 84 to either lock/unlock the hard disk or power-down the computer, a "key" icon 86 in the control panel for adjusting program parameters, and a "vault" object 88 to indicate whether the hard disk is locked or not (e.g. the vault door is either closed or open).

It is desirable that some form of warning label be applied to the exterior of the notebook computer 10 to deter a would-be thief. Such a practice is common with home burglary systems. The label should state that the computer is protected by a security system that will not permit operation without a special key device.

The utility of the invention is not limited to deterrence of computer hardware theft. For example, the key device 20 may also be used as a new and improved "dongle" for software copy protection. A dongle is a hardware security device that attaches to an I/O port, typically the parallel port, of a computer and contains a unique key number. To protect against software theft, third party applications 91 may require retrieval of a key, such as that stored in a dongle, to permit execution. With little or no modification, the key device 20 may be used as a dongle. In addition, software developers may incorporate into their applications the user validation procedure and PS-2/USB/IR communications protocols described above.

The foregoing has been limited to specific embodiments of this invention. It will be apparent, however, that variations and modifications may be made to the embodiments, with the attainment of some or all of their advantages. Therefore, it is the object of the appended claims to cover all such variations and modifications as come within the true spirit and scope of the invention.

What is claimed is:

1. An infrared (IR) multilevel security system to prevent unauthorized use of a computer, said system comprising:
   an infrared receiving port on the computer;
   an infrared key device having an IR transmitter and carrying at least a first serial number, and an encryption key, said infrared key device having a transmit switch which is manually operable to send an infrared message to the computer;
   a device installed in said computer storing a second serial number;
   a storage device installed in said computer and storing a validation record, having a copy of said first serial number and an encrypted copy of said second serial number;
   a computer program to compare said first serial number from said key device with said copy of the first serial number inside said computer and to decrypt said encrypted copy of said second serial number, and to compare said decrypted copy of said second serial number with said second serial number; and
   means for automatically powering down said computer if said copy of said second serial number and the decrypted second serial number do not match.

2. A security system as in claim 1 including a microprocessor in said infrared key device, which is programmed to enable sending an infrared message using infrared Data Association Protocol (IrDA).

3. A security system as in claim 1 wherein said validation record includes a personal identification number (validation record PIN), said system including a keyboard for a user to enter an entered version of a PIN (entered PIN), said computer program being provided for comparing said validation record PIN with said entered PIN; and means for automatically powering down said computer if said validation record PIN and entered PIN do not match.

4. A security system as in claim 1, wherein said key device has a key device access code and said validation record has a copy of a validation access code; said system including means for writing said validation access code to said key device, said key device including means for comparing the key device access code and said validation access code, said system also including means for automatically powering down the computer if the key device access code and said validation access code do not match.

5. A method of providing infrared (IR) multilevel security to prevent unauthorized use of a computer which includes an infrared message receiving port, comprising the steps of:
   providing an infrared self-powered key device having an IR transmitter and carrying (i) at least a first serial number; (ii) an encryption key and (iii) a manually operable switch which can send an infrared message to the receiving port of the computer;
   installing a storage device in the computer and storing therein a validation record, said validation record having a copy of said first serial number and an encrypted copy of said second serial number;
   providing a computer program for comparing said first serial number from the key device with said copy of the first serial number inside the computer and for decrypting said encrypted copy of said second serial number with said encryption key; and
   automatically powering down said computer if said copy of said second serial number and the decrypted second serial number do not match.

6. A method of providing IR multilevel security as in claim 5 including the steps of:
   providing a personal identification number (validation record PIN), said method including a user entering an entered version of PIN (entered PIN), said method including enabling said computer program to compare said validation record PIN and said entered PIN to check for a match; and automatically powering down said computer if said validation record PIN and said entered PIN do not match.

7. A computer-readable medium comprising: instructions and data written thereon, said instructions and data containing information for the practice of the method of the claim 5.

8. Electromagnetic signals traveling over a computer network comprising: said electromagnetic signals carrying information for the practice of the method of claim 5.

9. An infrared (IR) multi-level security system to prevent unauthorized use of a computer, said system comprising:
   an IR key device used proximate to the computer by the user to gain use of the computer, said key device carrying at least a first serial number;
   a storage device installed in said computer and storing a validation record, said validation record having a copy of said first serial number;
   an infrared port in said computer to provide a pathway to receive and read at least said first serial number;
   a computer program to compare said first serial number from said key device with said copy of said first serial number;
   means for automatically powering down said computer if said first serial number and said copy of said first serial number do not match;

said key device carrying an encryption key and means to transmit the encryption key to said infrared port;

said computer having a device to store a copy of a second serial number;

said validation record having an encrypted portion, said encrypted portion carrying an encrypted copy of said second serial number;

said computer program to decrypt said second serial number from said validation record using said encryption key, to produce a decrypted version of said second serial number, and to compare said decrypted version of said second serial number with said copy of said second serial number;

means for automatically powering down said computer if said copy of said second serial number and said decrypted copy of said second serial number do not match;

said validation record carrying a personal identification number (validation record PIN);

a keyboard for a user to enter an entered version of a PIN (entered PIN);

a computer program to compare said validation PIN with said entered PIN;

means for automatically powering down said computer if said validation PIN and said entered PIN do not match;

said key device carrying a key device access code;

said validation record having a copy of said validation access code;

means for writing said validation access code to said key device, and key device having means for comparing said key device access code to said validation access code; and, means for automatically powering down said computer if said key device access code and said validation access code do not match.

10. A method of providing IR multilevel security as in claim 5 including the steps of:

providing a personal identification number (validation record PIN), said method including a user entering an entered version of PIN (entered PIN), said method including enabling said computer program to compare said validation record PIN and said entered PIN to check for a match; and automatically powering down said computer if said validation record PIN and said entered PIN do not match.

11. The method of claim 10 further comprising:

providing a microprocessor in said infrared key device carrying a key device access code in said key device;

carrying a copy of said validation access code in said validation record;

writing said validation access code to said key device, said key device comparing said key device access code to said validation access code; and powering down said computer if said key device access code and said validation access code to not match.

12. A security system to prevent unauthorized use of a computer, said system comprising:

a key device carrying a serial number;

means for interfacing said key device with said computer;

a device installed in said computer storing a validation record, said validation record having at least a copy of a serial number and a PIN (validation record PIN);

a keyboard for a user to enter an entered version of a PIN (entered PIN);

a computer program to compare said serial number from said key device with said copy of said serial number and compare said validation record PIN with said entered PIN; and means for powering down said computer if said serial number and said copy of said serial number do not match OR if said validation record PIN and said entered PIN do not match.

13. The security system of claim 12 further comprising:

means for removing said key device from connection with said computer after authorized use of said computer has been gained and during operation of said computer.

14. The security system of claim 12, wherein said means for interfacing further comprises:

an infrared port.

15. The security system of claim 12, wherein said means for interfacing further comprises:

a USB port.

16. The security system of claim 12, wherein said means for interfacing further comprises:

a PS-2 port.

17. The security system of claim 12, wherein said PIN further comprises:

a string of characters.

18. The security system of claim 12 further comprising:

said key device containing an access code (key device access code);

said validation record containing a copy of said access code number (validation record access code);

means for writing said validation record access code to said key device;

a device in said key device to compare said key device access code and said validation record access code; and means for disallowing use of said computer if said key device access code and said validation record access code do not match.

19. The security system of claims 18, wherein said access code further comprises:

a numerical string.

20. A security system to prevent unauthorized use of a computer, said system comprising:

a key device carrying an encryption key means for interfacing said key device with said computer;

a keyboard for a user to enter an entered version of a PIN (entered PIN);

a device installed in said computer storing a validation record, said validation record including an encrypted version of a PIN (validation record PIN);

a computer program to decrypt said encrypted validation record PIN using said encryption key, to produce a decrypted version of said validation record PIN, and to compare said decrypted version of said validation record PIN with said entered PIN; and means for disallowing use of said computer if, said decrypted version of said validation record PIN and said entered PIN do not match.

21. The security system of claim 19 further comprising:

means for removing said key device from said computer after authorized use of said computer has been gained and during operation of said computer.

22. The security system of claim 20 further comprising:

disallowing use by powering down said computer.

23. The security system of claim 20 further comprising:
disallowing use by locking a hard disk.

24. The security system of claim 20, wherein said means for interfacing further comprises:
an infrared port.

25. The security system of claim 20, wherein said means for interfacing further comprises:
USB port.

26. The security system of claim 20, wherein said means for interfacing further comprises:
a PS-2 port.

27. The security system of claim 20, wherein said PIN further comprises:
a string of characters.

28. The security system of claim 20 further comprising:
said key device having an access code number (key device access code);
said validation record including a copy of said access code (validation record access code).
means for writing said validation record access code to said infrared key device;
a microprocessor in said key device to compare said key device access code and said validation record access code; and
means for disallowing use of said computer if said key device access code and said validation record access code do not match.

29. The security system of claim 28, wherein said access code further comprises:
a numerical string.

30. A method for securing a computer to prevent unauthorized use thereof, comprising the steps of:
carrying a serial number in a key device;
storing a validation record in at least one storage device installed in said computer, said validation record having a copy of said serial number and a PIN (validation record PIN);
entering by keyboard an entered version of a PIN (entered PIN);
providing a pathway to read said serial number through an interface connecting said key device to said computer;
comparing said serial number from said key device to said copy of said serial number and comparing said validation record PIN to said entered PIN;
powering down said computer if said serial number from said key device and said copy of said serial number OR said validation record PIN and said entered PIN do not match.

31. The method of claim 30 further comprising the steps of:
storing in said validation record an access code (validation record access code);
storing in said key device an access code (key device access code);
writing said validation record access code to said key device;
comparing in said key device said validation record access code and said key device access code;
disallowing use of said computer if said key device access code and said validation record access code do not match.

32. A method for securing a computer to prevent unauthorized use thereof, comprising the steps of:
carrying a encryption key in a key device;
storing a serial number in a device in said computer;
storing a validation record in at least one storage device installed in said computer, said validation record having an encrypted copy of said serial number and a PIN (validation record PIN);
entering by keyboard an entered version of a PIN (entered PIN);
providing a pathway to read said encryption key through an interface connecting said key device to said computer;
decrypting said encrypted copy of said serial number from said validation record using said encryption key, to produce a decrypted version of said serial number;
disallowing use of said computer if said serial number and said decrypted copy of said serial number OR said validation record PIN and said entered PIN do not match.

33. The method of claim 32 further comprising the steps of:
storing in said validation record an access code (validation record access code);
storing in said key device an access code (key device access code);
writing said validation record access code to said key device;
comparing in said key device said validation record access code and said key device access code;
disallowing use of said computer if said key device access code and said validation record access code do not match.

* * * * *